United States Patent [19]

Chereda

[11] 4,032,167
[45] June 28, 1977

[54] TRAILER FOR TRANSPORTING MOTORCYCLES

[76] Inventor: Wasiliy Chereda, 914 Miller St., Holdrege, Nebr. 68949

[22] Filed: Jan. 9, 1976

[21] Appl. No.: 647,736

[52] U.S. Cl. .................. 280/106 T; 214/85; 280/400
[51] Int. Cl.² ................................. B62D 63/06
[58] Field of Search ........... 280/106 T, 402, 292, 280/63, 43.11, 400; 214/85, 450; 105/368 R

[56] References Cited

UNITED STATES PATENTS

| | | | |
|---|---|---|---|
| 1,280,141 | 10/1918 | Bonner | 214/516 |
| 2,988,382 | 6/1961 | Holland | 280/400 |
| 3,025,985 | 3/1962 | Crawford | 214/505 |
| 3,282,603 | 11/1966 | Barth | 280/106 T |
| 3,352,440 | 11/1967 | Wilson | 214/85 |
| 3,625,545 | 7/1971 | Somers | 280/400 |
| 3,687,318 | 8/1972 | Casey | 214/450 |
| 3,731,830 | 5/1973 | Long | 214/450 |
| 3,734,558 | 5/1973 | Stead | 296/23 R |
| 3,753,579 | 8/1973 | Kurlich | 280/400 |
| 3,817,556 | 7/1974 | Nyman | 280/400 |
| 3,822,798 | 7/1974 | Neff | 214/85 |
| 3,912,139 | 10/1975 | Bowman | 224/29 R |

Primary Examiner—Joseph F. Peters, Jr.
Assistant Examiner—John A. Carroll
Attorney, Agent, or Firm—Robert A. Ostmann

[57] ABSTRACT

This disclosure concerns a trailer for safely and easily transporting full-size motorcycles. The trailer employs a drop or low slung load-supporting bed provided with decking and at least one channel-shaped longitudinal cycle track having a pivoted ramp portion. These features permit the cycle to be driven onto the trailer under power. A stored cycle is confined by the track, the ramp and a wheel well located at the forward end of the track, all of which engage only the cycle tires. Secure retention of a stored cycle is accomplished solely by clamping mechanism which compresses the cycle in the longitudinal direction between surfaces of the wheel well and the ramp.

10 Claims, 9 Drawing Figures

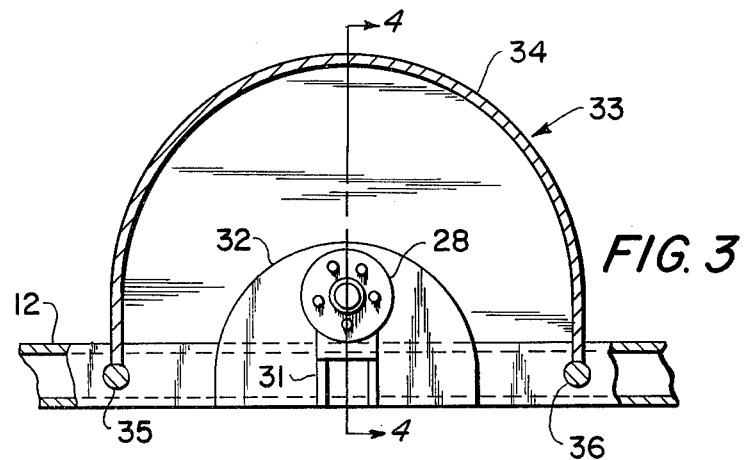
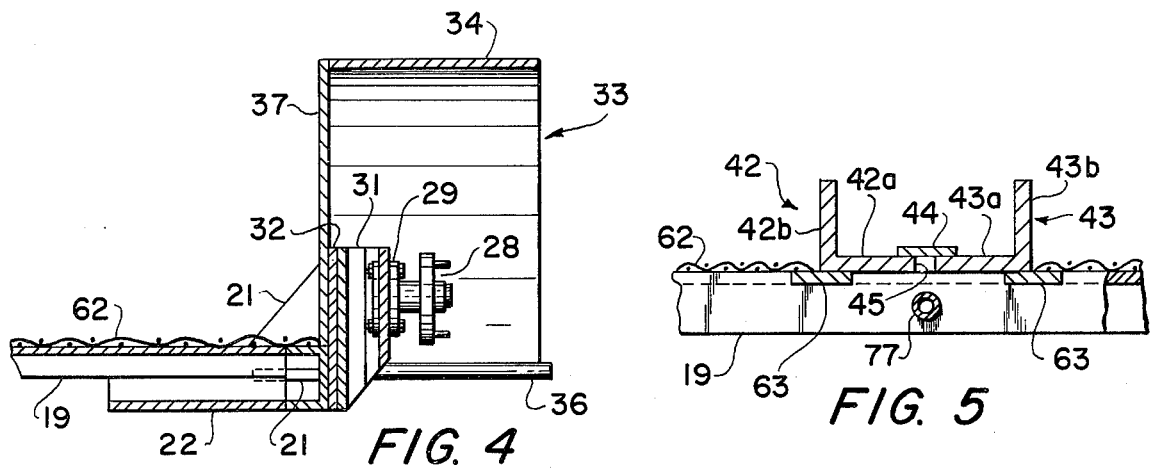
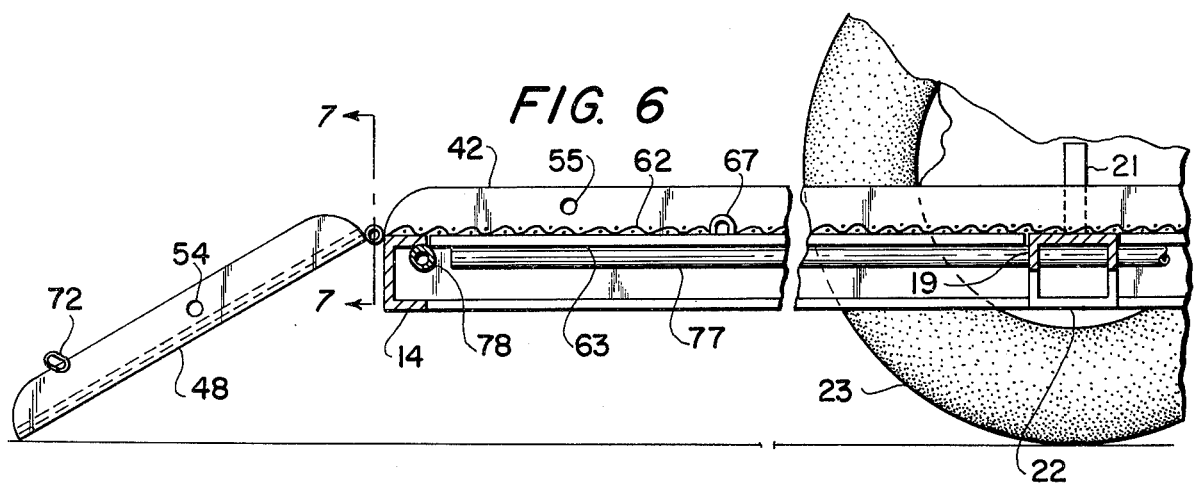

TRAILER FOR TRANSPORTING MOTORCYCLES

BACKGROUND AND SUMMARY OF THE INVENTION

The prior art contains various examples of trailers adapted for use in transporting motorcycles. However, all of the prior proposals of which I am aware are characterized by undesirable attributes which limit their utility. One of the major disadvantages of these trailers is that their designs are based on the premise that the cycle may be either lifted or pushed onto the storage track. This approach makes it difficult, not to mention dangerous, to load full-sized motorcycles, which weigh 500 pounds or more. A second major disadvantage of the prior proposals is that they employ tie-down apparatus for holding stored cycles in place which is inconvenient to use, and which is adapted to engage the frame or structure of the cycle. This last mentioned characteristic is particularly undesirable because it can result in scratching of the painted or bright metal surfaces of the motorcycle, and may preclude handling of cycles of different designs.

The object of this invention is to provide an improved motorcycle-transporting trailer which permits full-sized motorcycles to be loaded and unloaded safely and easily and which is sufficiently versatile to handle most, if not all, of the various brands and models of such cycles which are marketed today. According to the invention, the trailer comprises a rigid frame which carries a pair of stub axles for the ground-engaging wheels, and which provides a horizontal load-supporting bed located at an elevation below the centerline of those axles. This bed supports at least one longitudinally-extending, channel-shaped main track, which is designed to closely confine the tires of a motorcycle, and is provided with decking which extends longitudinally along both sides of that track. Near its forward end, the main track is equipped with a wheel well having front and side panels which confine the tread and sidewalls, respectively, of the cycle tire in both the lower and the upper forward quadrants of the front cycle wheel. At its rear end, the main track is provided with an auxiliary track section of similar design which is mounted for pivotal movement about a horizontal axis. The auxiliary track section has a loading position, in which it engages the ground and serves as a ramp for leading a motorcycle onto the main track, and a clamping position, in which it bears against the rear tire of a stored cycle in the upper rear quadrant of the cycle wheel. A clamping mechanism, which reacts between the trailer and the auxiliary track section when the latter is in clamping position, presses the auxiliary track against the tire, and thereby forces the front tire of the stored cycle longitudinally against the front panel of the wheel well.

The provision of the low, drop bed, the track, the ramp and the decking makes it practical and safe for an operator to drive a motorcycle onto the trailer under power. Thus, the invention facilitates loading of heavy, full-sized motorcycles. Moreover, once the cycle is on the trailer, it is confined by the wheel well, the main track, and the auxiliary track, which engage only the rubber tires of the cycle, and is reliably held in place solely by the force exerted on the auxiliary track by the clamping means. Therefore, scratching of the cycle frame is avoided, variations in the design of the cycle frame are irrelevant, and securing of the cycle on the trailer is a relatively simple task. In short, the invention makes it possible for one man to safely and quickly load and transport a large heavy motorcycle.

In its preferred form, the new trailer incorporates additional desirable features. Among these are:

a. The use of a front panel on the wheel well which is curved on a radius approximating that of the cycle tire, and which, therefore, distributes the clamping force and affords superior holding action.

b. the use of a chain and toggle type chain tightener as the clamping means. This expedient is advantageous because of its simplicity, and also because it utilizes readily available, simple commerical parts.

c. The inclusion of fenders for the ground-engaging trailer wheels which fully enclose those portions of the treads and inboard sides of the wheels, located above the load-supporting bed, and therefore protects the motorcycle from flying gravel, etc.

d. The use of a longitudinally adjustable wheel well which is secured by separable fasteners. This feature allows cycles of different lengths to be transported without major modification of the trailer.

e. The inclusion of apparatus for permitting simultaneous transport of a plurality of motorcycles.

BRIEF DESCRIPTION OF THE DRAWINGS

The preferred embodiment of the invention is described herein in detail with reference to the accompanying drawings, in which:

FIG. 3 is a sectional view, on enlarged scale, taken on line 3—3 of FIG. 2.

FIG. 4 is a sectional view taken on line 4—4 of FIG. 3

FIGS. 5 and 6 are enlarged sectional views taken on lines 5—5 and 6—6, respectively, of FIG. 2

DESCRIPTION OF THE PREFERRED EMBODIMENT

Figure 1:
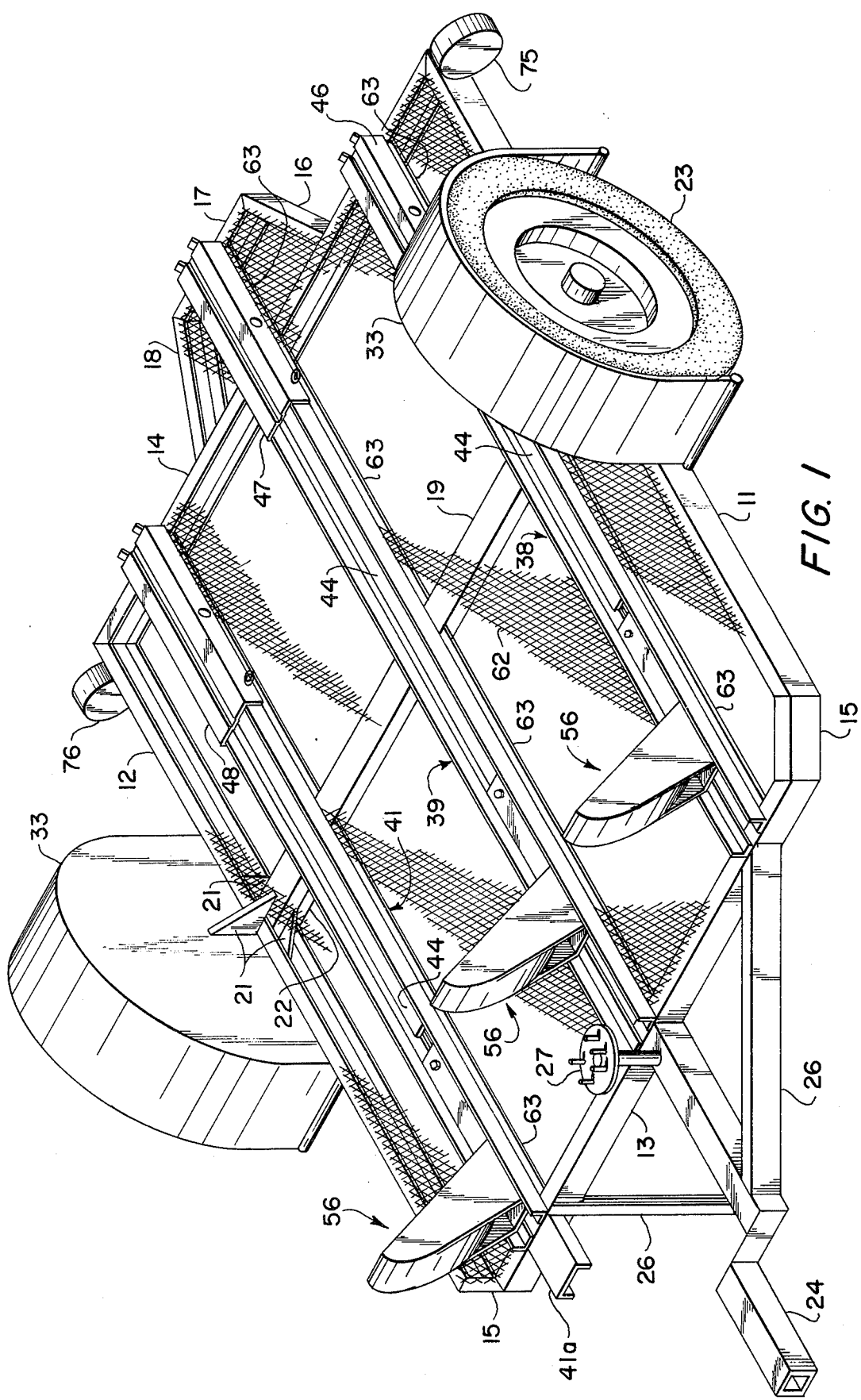
FIG. 1 is an isometric view of the improved trailer.
Figure 2:
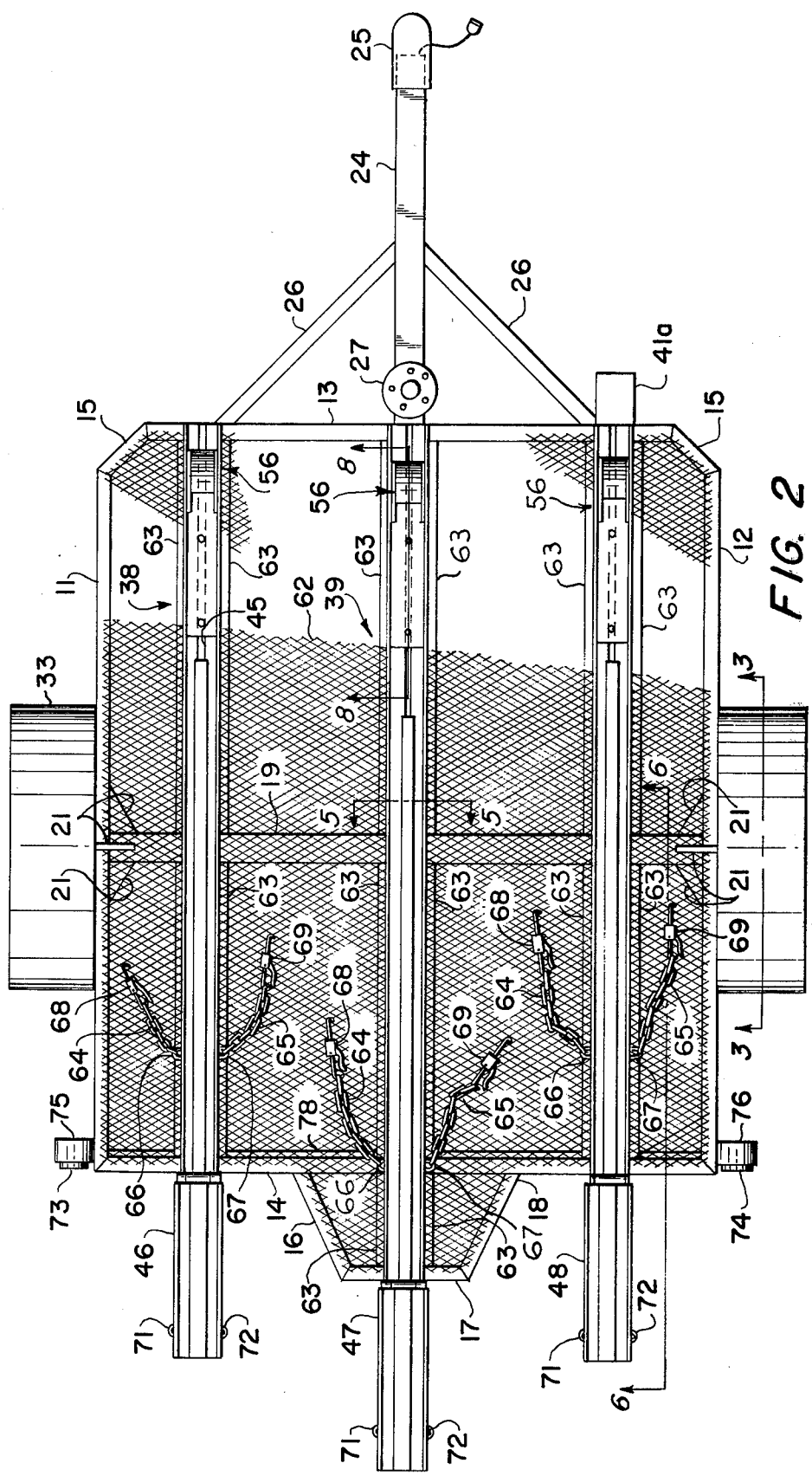
FIG. 2 is a plan view of the trailer.

Referring first to FIGS. 1 and 2, the illustrated trailer employs a rigid, main frame comprising a pair of side members 11 and 12, front and rear cross members 13 and 14, and a pair of front corner members 15, and a centrally located rear frame extension formed of members 16, 17 and 18. All of these members are channel irons welded together with their webs lying in vertical planes and their legs lying in two common horizontal planes. The main frame also includes an intermediate cross channel 19 which is welded to side channels 11 and 12 and is oriented so that its web lies in the same horizontal plane as the upper legs of the other channels. The junction between each end of cross channel 21 and a side channel is reinforced by three gussets 21, and by a short length of channel 22 which is welded to member 19 to form a box (see FIG. 4). These measures provide the strength and rigidity needed for the mountings of the trailer wheels 23. At its front end, the trailer is provided with a tongue 24, to the free end of which is attached the socket part 25 of a conventional ball hitch. The tongue is made of a square tube which is welded to the center of front channel 13 and is braced by a pair of diagonal channel irons 26. A spare wheel carrier 27, composed of a standard studded wheel hub and a pipe pedestal, is carried by tongue 24.

As shown in FIGS. 3 and 4, each of the trailer wheels 23 is mounted on a conventional automotive wheel spindle assembly 28, which is provided with a mounting flange 29 and is bolted to a short, vertical box beam 31. This beam, which may be formed of two channel irons welded together, is welded to a generally semi-circular vertical supporting plate 32 which, in turn, is welded to the web of frame side channel 11 or 12 and to the vertical gusset plate 21. The axes of the spindle assemblies 28 are, of course, aligned, and the common axis is located at an elevation above the elevation of the load-carrying portion of the trailer frame. Each wheel 23 is shrouded by a fender 33, which comprises a curved panel 34 whose ends are attached to rods 35 and 36, and a flat vertical panel 37. The fender components are welded together, and the complete assembly is welded to the trailer frame. It will be observed that the fender completely encloses those portions of the tread and the inboard side of wheel 23 which lie above the load-carrying bed (i.e., the upper legs of the channel members of the main frame). This arrangement completely protects the transported motorcycle from gravel and other objects that might be picked up and propelled by the wheels 23.

The illustrated trailer is intended to transport one to three motorcycles; accordingly, it is equipped with three cycle-carrying tracks 38, 39 and 41. These tracks are arranged in parallel and they extend longitudinally between the front and rear margins of the trailer frame. As shown in FIGS. 1, 2 and 5, each track is of channel shape and is formed from a pair of angle irons 42 and 43 which are interconnected by a bridging strip 44 which is welded to the opposing angle legs 42a and 43a. The angles of the outer tracks 38 and 41 are welded to the channels 13, 14 and 19 of the main frame, and the angles of intermediate track 39 are welded to these members and also to the cross channel 17 of the frame extension. The two angles 42 and 43 of each pair are spaced laterally from each other so that the distance between the upstanding angle legs 42b and 43b is just slightly greater than the width of a standard cycle tire. In this way, the track serves to closely confine the cycle tires. The height of the upstanding legs 42b and 43b is so selected that these parts confine a major portion of the tire sidewall, but do not contact the wheel rim. It will be noted that the bridging strips 44 are shorter than the angle irons 42 and 43, thereby leaving exposed a gap 45 between the opposing angle legs 42a and 43a at the forward end of each track. The purpose of this arrangement will become evident as the description proceeds.

Figure 7:
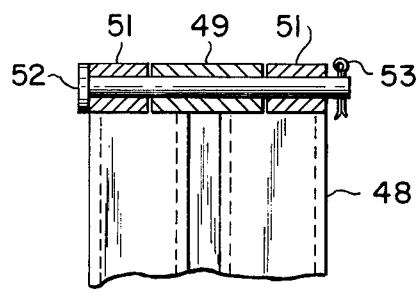
FIG. 7 is an enlarged sectional view taken on line 7—7 of FIG. 6.
Figure 9:
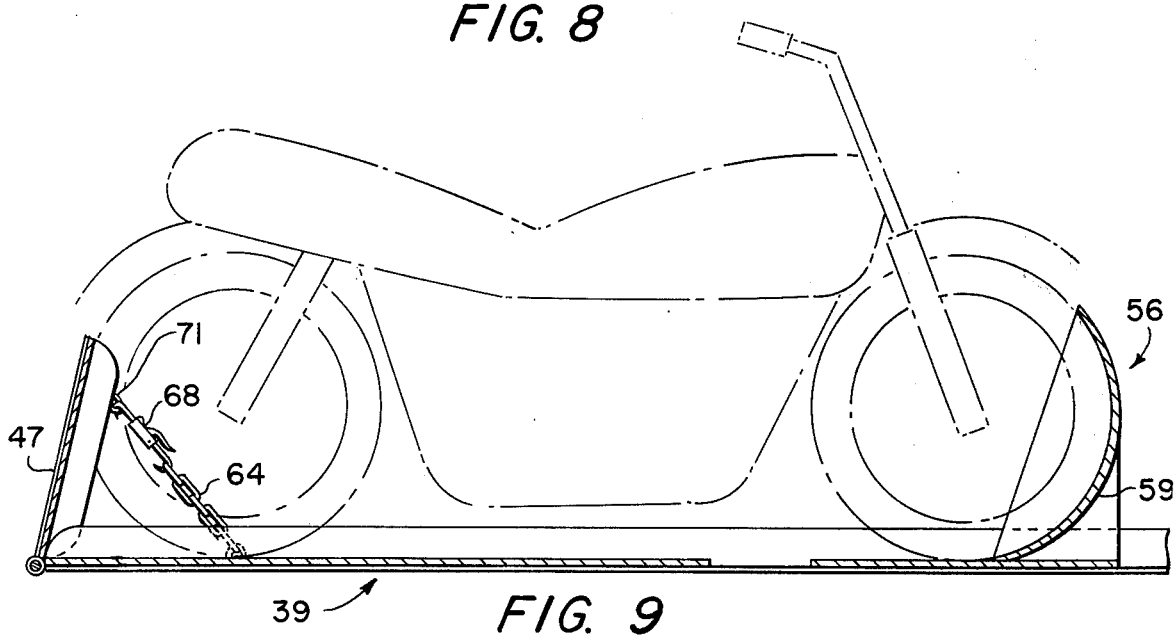
FIG. 9 is an enlarged diagrammatic sectional view similar to FIG. 8 showing the manner in which a motorcycle is secured in place on the trailer.

At its rear end, each of the tracks 38, 39 and 41 is provided with an auxiliary track section 46, 47 or 48. These auxiliary tracks are constructed in essentially the same way as the main tracks, but they are slightly wider so that each can fit over the associated main track. As shown best in FIG. 7, each of the auxiliary tracks 46, 47 and 48 is connected to the trailer frame by a hinge which comprises a sleeve 49 welded to frame channel 14 or 17, a pair of aligned sleeves 51 welded to one end of the track section at opposite sides of sleeve 49, and a hinge pin 52. The hinge connections afford pivotal motion about horizontal axes, and the auxiliary tracks are free to move between a ground-engaging position (see FIG. 6), in which they serve as ramps for leading motorcycles onto the main tracks, and a clamping position (see FIG. 9), in which they bear against the treads of the rear tires of the cycles being transported. The hinge pins 52 are held in the hinge sleeves by cotter pins 53, so that the auxiliary track associated with an unoccupied main track can be removed easily. A detached auxiliary track is stored on the associated main track, as indicated in FIG. 1; the parts being held together by the hinge pin 52, which is passed through aligned holes 54 and 55 in the upstanding legs of the angles of the auxiliary and main tracks, respectively, and retained by the cotter pin 53.

Figure 8:
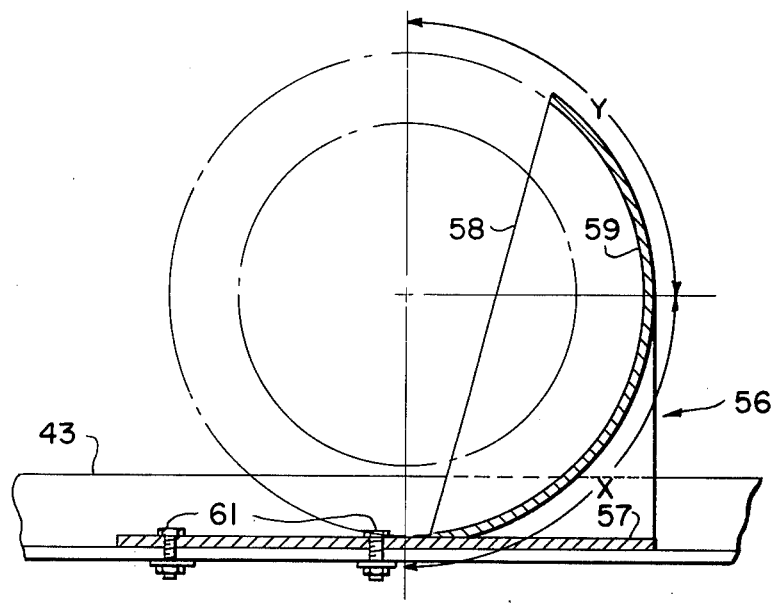
FIG. 8 is a sectional view, on enlarged scale, taken on line 8—8 of FIG. 2.

Each of the main tracks 38, 39 and 41 also is equipped with a wheel well 56 which fits in the track at its forward end. As shown in FIGS. 1, 2 and 8, each of the wells 56 comprises a base plate 57, to which are welded a pair of side panels 58 and a front panel 59. The well is adjustable in the longitudinal direction of the track in order to accommodate different cycle lengths, and is fixed in place by a pair of bolts 61 which extend through the gap 45 bounded by the angle legs 42a and 43a. The front panel 59 is curved on about the same radius as the standard cycle tire, so that it has substantial surface contact with the tire tread in both the lower and the upper forward quadrants X and Y of the cycle wheel. The sidewalls of the front tire also are confined by the side panels 58 in both of those quadrants. As a result, the well 56 precludes turning, forward and up and down motion of the front cycle wheel.

It should be noted here that, since center track 39 has a greater rearward extent than the tracks 38 and 41, the forward edge of its bridging strip 44 is set back from the bridging strips of the outer tracks. This enables the well 56 associated with track 39 to assume a position to the rear of the other wells, and thus establish longitudinal offset between cycles stored on adjacent tracks. This is advantageous because it effects a reduction in the overall width of the trailer.

Attention also is invited here to the short channel iron 41a which is welded to front frame channel 13 in alignment with main track 41. This member 41a is arranged to support the forward end of the wheel well 56 associated with track 41, and thereby allows this wheel well to assume a more forward position than the other wells. As a reslt, track 41 can handle those unusually long motorcycles which are equipped with extended front yokes.

As mentioned earlier, it is intended that cycles to be transported will be driven onto the trailer under power. If this is to be done safely, the trailer must provide secure footing for the driver. This requirement is well satisfied by a decking 62 of heavy duty wire mesh which covers the entire frame, including the rear frame extension. The mesh 62 is welded to the frame channel members 11–18, and also to support strips 63 which are welded to the horizontal legs of the track angle irons 42 and 43.

The auxiliary tracks 46, 47 and 48 of the illustrated trailer are provided with clamping mechanisms which are used to press the track sections against the rear tires of cycles on the associated main tracks, and thereby compress the cycles against the front panels of wheel wells 56. Each clamping mechanism comprises two chains 64 and 65 which are attached to loops 66 and 67 welded in place at opposite sides of the track angles, and a pair of toggle type chain tighteners 68 and 69. A suitable, commercially available chain tightener is the MY-T-MYT unit manufactured by Durbin Durco of St. Louis, MI. The hooks at opposite ends of each chain tightener engage, respectively, a link of the associated chain 64 or 65 and a loop 71 or 72 welded to one of the angles of the auxiliary track section. Although it is not essential that the tighteners be permanently attached to their chains, this measure does minimize the risk of loss or theft.

Inasmuch as the trailer undoubtedy will be used much of the time on highways, safety considerations dictate the inclusion of tail lights. These lights 73 and 74 are mounted in protective metal covers 75 and 76 welded to the outer faces of the webs of side channels 11 and 12, respectively, adjacent their rear ends. The electrical leads for the lights are routed to them along a path which includes the hollow tongue 24, a hole (not shown) in the web of front channel 13, a longitudinally extending pipe 77 located on the centerline of the trailer beneath track 39, and a transverse pipe 78 which spans the width of the trailer and is positioned adjacent the forward margin of rear frame channel 14. It will be noted in FIG. 6, that the pipes 77 and 78 do not join, but are spaced apart a small distance, for example, 1 inch. This arrangement facilitates installation and replacement of the electrical leads. Except for this small region of exposure, the wires are totally enclosed. Therefore, they are adequately protected.

In order to transport a motorcycle, the auxiliary track section of the track 38, 39 or 41 which is to be used is removed from the storage position shown in FIG. 1, mounted at the rear of the main track on hinge pin 52, and then swung to the loading position of FIG. 6. The operator may now drive the cycle up the auxiliary section 46, 47 or 48 and onto the associated track. Because of the low slung load-carrying bed, the driver can balance the cycle by resting his feet on the ground until the front wheel is well onto the main track. Thereafter, the decking 62 provides the secure footing needed for balancing. The cycle is now driven forward along the track until the front wheel enters well 56, and the tire abuts curved front panel 59. The wheel well will hold the cycle upright, so the driver may dismount and clamp the motorcycle in place. This is accomplished simply by pivoting the auxiliary track to the clamping position shown in FIG. 9, attaching the two chain tighteners 68 and 69 to the chains 64 and 65, if they are not permanently attached, and to the loops 71 and 72, and then setting the toggle latches of the tighteners. This last step forces the auxiliary track section against the rear cycle tire, so the cycle is compressed longitudinally between this section and the front panel 59 of the wheel well 56, and its suspension system is slightly deflected.

A stored cycle is held in place solely by the auxiliary track section and the wheel well. Therefore, the auxiliary track section must engage the rear tire in the upper rear quadrant of the rear wheel, for otherwise severe bumps could cause the rear wheel to move up relatively to, and out of the grasp of, the auxiliary track, with obvious disasterous consequences. The location of the point of contact between the rear tire and the auxiliary track can be changed easily by altering the longitudinal position of the wheel well 56. Extensive testing has shown that, when the wheel well is properly positioned, the disclosed holding arrangement is completely reliable, even when the trailer moves at high speed over very rough roads.

Although the illustrated trailer is designed to handle three motorcycles, it may be used to transport one or two. Moreover, experience shows that, in these cases, the cycle or cycles may be stored on any of the tracks. In other words, symmetrical loading of the trailer is not required. In situations where adjacent tracks are being utilized, the outer track or tracks obviously should be loaded before the center track.

Unloading of a cycle from the trailer is accomplished by releasing the chain tighteners 68 and 69, pivoting the auxiliary track to the loading position, and rolling the cycle backwards along the main track and then down the ramp. Since the deck 62 provides secure footing the operator can sit on the cycle and propel it with his feet.

I claim:

1. A trailer for transporting motorcycles comprising
   a. a rigid frame having a horizontal load-supporting bed;
   b. a pair of ground-engaging wheels mounted on aligned stub axles which are carried by and project from opposite sides of the frame, the axles being centered at an elevation above that of the bed;
   c. at least one elongated, channel-shaped main track supported on the bed and extending forward from the rear margin thereof, the main track serving to receive and closely confine the tires of a motorcycle;
   d. a wheel well fixed in place at the forward end of the main track and serving to receive a portion of the front wheel of a motorcycle, the well comprising side panels which extend along the sidewalls of the cycle tire in both the upper and lower front quadrants of the wheel, and a front panel which engages the tire tread in both of those quadrants, whereby turning, forward and vertical motion of the front cycle wheel is prevented;
   e. a channel-shaped auxiliary track section pivotally connected with the frame at the rear end of the main track and forming a longitudinal extension of the main track, the auxiliary track section being free to swing about a horizontal axis and having a loading position, in which it engages the ground and forms a ramp for leading a motorcycle onto the main track, and a clamping position, in which it engages the tread of the rear tire of the cycle stored on the main track at a point in the upper rear quadrant of the cycle wheel;
   f. deck means fixed to the frame and extending longitudinally along both sides of the main track, and deck means providing secure footing for a driver guiding a cycle onto the trailer under power; and
   g. clamping means for interconnecting the frame and the auxiliary ramp section when the latter is in said clamping position and for pressing that track section tightly against the rear tire of a cycle stored on the main track,
   h. whereby the stored cycle is compressed longitudinally between the front panel of the wheel well and the auxiliary track section and is retained in place solely by the action of the clamping means.

2. A trailer as defined in claim 1 in which said front panel of the wheel well is curved on a radius so that it fits the front tire of the motorcycle.

3. A trailer as defined in claim 1 in which said clamping means includes a chain, and a manually actuated, toggle type chain tightener.

4. A trailer as defined in claim 3 in which there are two clamping means, one being located at each side of the track.

5. A trailer as defined in claim 1 in which said wheel well is adjustable longitudinally of the main track and is fixed in place by separable fastener means.

6. A trailer as defined in claim 1 including a fender for each ground-engaging wheel which is attached to said frame, each fender shrouding those inboard and tread portions of the wheel above the elevation of the load-supporting bed.

7. A trailer as defined in claim 1 in which said deck means is a wire mesh.

8. A trailer as defined in claim 1 in which there are a plurality of said main tracks arranged in parallel and spaced from each other transversely of the trailer, each main track being provided with said wheel well, said auxiliary track, said deck means and said clamping means.

9. A trailer as defined in claim 8 in which there are three main tracks, the central track and its wheel well being arranged to store a motorcycle in a position longitudinally offset from the storage positions afforded by the two remaining tracks.

10. A trailer as defined in claim 1 in which said load-supporting bed is defined by channels which are welded together with their legs lying in common horizontal planes and their webs lying in vertical planes.

* * * * *